US009955011B1

(12) United States Patent
Billman

(10) Patent No.: US 9,955,011 B1
(45) Date of Patent: *Apr. 24, 2018

(54) SYSTEMS AND METHODS FOR PROVIDING ACCESS TO AVAILABLE AGENT

(71) Applicant: United Services Automobile Association (USAA), San Antonio, TX (US)

(72) Inventor: Bradly J. Billman, Celina, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/293,970

(22) Filed: Oct. 14, 2016

Related U.S. Application Data

(63) Continuation of application No. 14/937,353, filed on Nov. 10, 2015, now Pat. No. 9,473,638, which is a continuation of application No. 14/166,101, filed on Jan. 28, 2014, now Pat. No. 9,185,221, which is a continuation of application No. 12/362,260, filed on Jan. 29, 2009, now Pat. No. 8,638,925.

(51) Int. Cl.
*H04M 3/51* (2006.01)
*H04M 3/523* (2006.01)
*G06F 3/0482* (2013.01)
*G06F 3/0481* (2013.01)

(52) U.S. Cl.
CPC ....... *H04M 3/5191* (2013.01); *H04M 3/5175* (2013.01); *H04M 3/5233* (2013.01); *G06F 3/0482* (2013.01); *G06F 3/04817* (2013.01)

(58) Field of Classification Search
CPC .............. G06F 3/04817; G06F 3/0482; G06F 3/04842; H04M 3/5183; H04M 3/5191; H04M 3/523; H04M 3/5232; H04M 3/5233; H04M 3/5175
USPC .... 379/210.01, 265.01–266.1; 709/223, 224, 709/245
See application file for complete search history.

(56) References Cited

U.S. PATENT DOCUMENTS

| | | | | |
|---|---|---|---|---|
| 6,064,730 A * | 5/2000 | Ginsberg | ............ | H04M 3/5191 379/265.09 |
| 8,638,925 B1 * | 1/2014 | Billman | ................ | H04M 3/523 379/210.01 |
| 9,185,221 B1 * | 11/2015 | Billman | ................ | H04M 3/523 |
| 9,473,638 B1 * | 10/2016 | Billman | ................ | H04M 3/523 |
| 2006/0140390 A1 * | 6/2006 | Dezonno | ............ | H04M 3/5232 379/265.12 |

* cited by examiner

*Primary Examiner* — Harry S Hong
(74) *Attorney, Agent, or Firm* — Kane Kessler, P.C.; Barry E. Negrin

(57) ABSTRACT

The availability of one or more agents of an institution to communicate with a user may be determined and reported to the user. Information pertaining to whether at least one of a plurality of agents is available to communicate with a user is determined. A number of selectable agent characteristics is provided to the user. A selection of at least two of a plurality of the selectable agent characteristics is received from the user, as is a priority ordering of the selectable agent characteristics. A call is established between the user and the at least one of a plurality of agents based on the information and the priority ordering. Call volume statistics may be provided to the user and may be used to determine when an agent is most likely unavailable and/or most likely available.

16 Claims, 6 Drawing Sheets

SYSTEMS AND METHODS FOR PROVIDING ACCESS TO AVAILABLE AGENT

RELATED APPLICATIONS

This application is a continuation of U.S. patent application Ser. No. 14/937,353, filed Nov. 10, 2015, which is a continuation of U.S. patent application Ser. No. 14/166,101, filed Jan. 28, 2014, now U.S. Pat. No. 9,185,221, which is a continuation of Ser. No. 12/362,260, filed on Jan. 29, 2009, now U.S. Pat. No. 8,638,925, all of which are hereby incorporated by reference herein.

BACKGROUND

When a user calls an institution to speak with an agent, many times the user has to wait on a queue to speak with the agent. The user may decide not to wait and hang up. In this manner, the user may delay or never speak with an agent, which may cost the institution good will and/or a transaction of products or services with the user.

Additionally, when a user calls an institution to speak with an agent, the user often is put on hold and transferred to a new location and put on hold before being able to speak with the agent. This often is a time-consuming and frustrating experience for the user. A user is not well-served if they have difficulty speaking with an institution's agent.

SUMMARY

The availability of one or more agents of an institution to communicate with a user may be determined and reported to the user. An application on a user computing device may provide an indication as to how many agents are currently available to speak with the user (if the user were to immediately phone in to the institution) and/or a wait time (such as an estimated wait time) until an agent becomes available. One or more call icons may be provided on the user computing device that the user may select to place a call to an available agent via the user computing device or that the user may select to receive a callback from an available agent.

In an implementation, a call may be established between a user and an available agent via any type of phone, such as a wired or wireless phone, a mobile phone, a cellular phone, a smartphone, a voice over Internet protocol (VOIP) phone, or a softphone. The call may be established automatically when an agent becomes available or upon selection of a call icon by the user. The call may be initiated at the user side or at the institution or agent side.

In an implementation, call volume statistics pertaining to one or more agents may be provided to the user via the user computing device. The call volume statistics may comprise information that may be used to determine when an agent or a group of agents (e.g., that share particular characteristics) is most likely unavailable and/or most likely available. Such information may comprise an average number of calls an agent handles in a particular time period, an average amount of time an agent spends on the phone in a particular time period, an average length of time between calls handled by an agent in a particular time period, etc.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
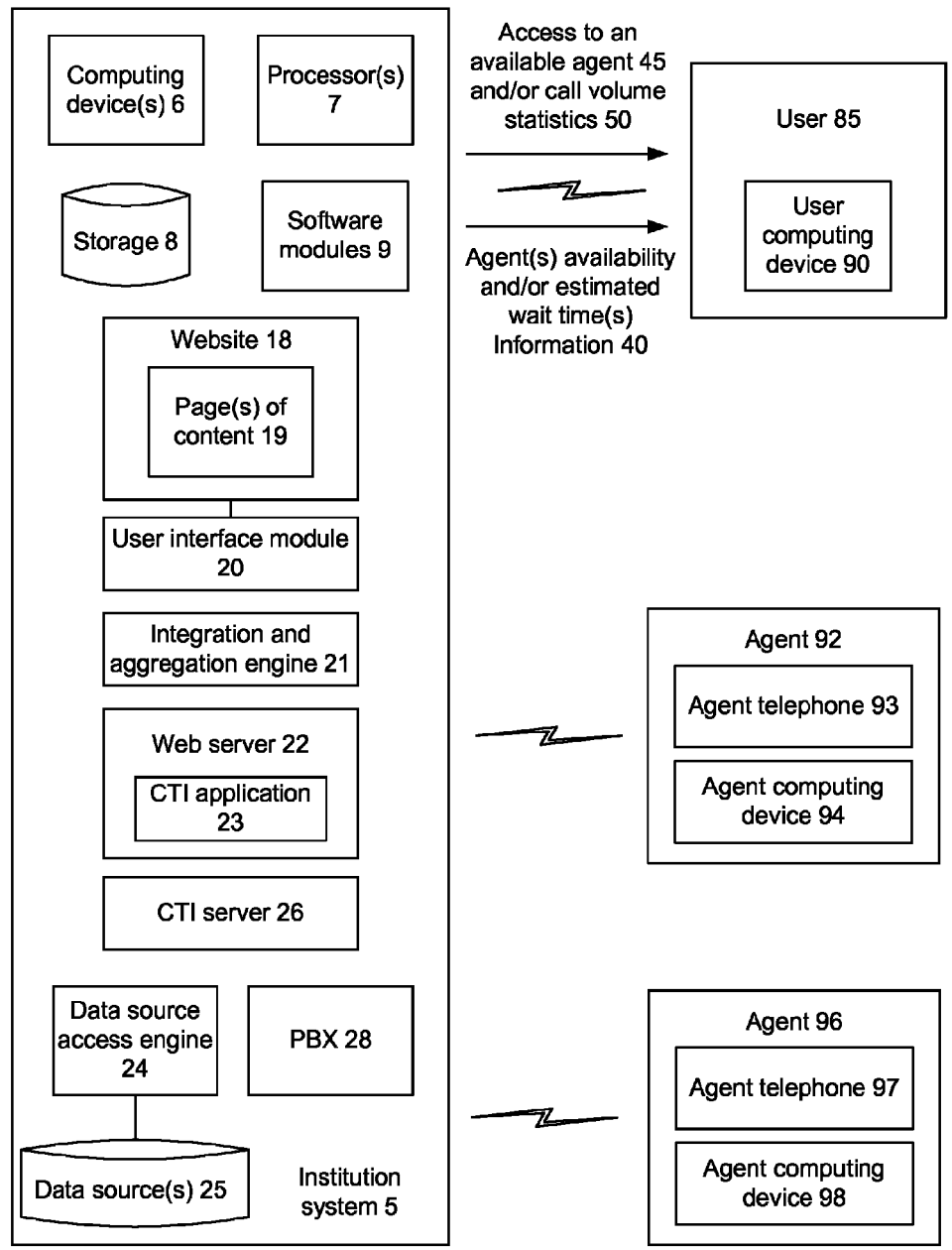
FIG. 1 is a block diagram of an implementation of a system that may be used to provide access to an available agent.

FIG. 1 is a block diagram of an implementation of a system that may be used to provide access to an available agent. An institution system 5, affiliated with or otherwise maintained by an institution such as a financial services institution or any other enterprise, may have many service representatives or service agents (may be referred to herein as "agents", such as agents 92 and 96) that may interact with customers, potential customers, enterprise members, etc. (may be referred to herein as "users", such as a user 85) via telephone and/or computing device. A typical implementation may have hundreds or thousands of agents, each having a telephone and a computing device, as described further herein.

The institution system 5 may comprise a computer telephony integration (CTI) application 23. CTI is a technology that allows interactions on a telephone and a computer to be integrated or coordinated. As contact channels have expanded from voice to include email, web, and facsimile, the definition of CTI has expanded to include the integration of user contact channels (voice, email, web, facsimile, etc.) with computer systems.

The following example functions may be implemented using CTI: call information display (e.g., caller's number, number dialed, and screen population on answer, with or without using calling line data), automatic dialing and computer controlled dialing (fast dial, preview, and predictive dial), phone control (e.g., answer, hang up, hold, conference), coordinated phone and data transfers between two parties, call center phone control (e.g., logging on, after call work notification), advanced functions such as call routing, reporting functions, automation of desktop activities, and multi-channel blending of phone, email, and web requests, and agent state control (e.g., after call work for a set duration, then automatic change to the ready state).

The CTI application 23 may manage the event flow that is generated by the telephony switch during the life cycle of a call. This typically proceeds along the following sequence: set up, deliver (ringing), establish (answer), clear (hang up), and end. Other call events that can be handled by the CTI application 23 may include hold, retrieve from hold, conference, transfer, and forward, for example. The CTI application 23 may handle events related to automated call distribution such as agent logged in, agent available, agent not available, agent ready, and agent not ready, for example.

A CTI application may be provided in a thick client arrangement or a thin client arrangement, depending on the implementation. In a thick client arrangement, a CTI application may be installed on a local hard drive of each agent's computer. Thus, in a thick client arrangement (not shown), each agent computing device 94, 98 may act as a thick client and have an associated CTI application stored thereon.

In contrast to a thick client arrangement, a thin client arrangement generally does as little processing as possible on the client computer's (e.g., the agent computing devices) and relies on accessing a server, such as a web server, each time input data needs to be processed or validated. In an implementation, the institution system 5 may provide the CTI application 23 that resides on a web server 22 and runs on the web server 22. In a thin client arrangement, such as that shown in FIG. 1, a web server 22 may comprise the CTI application 23 and may be used to manage the contact sessions of the agents 92, 96. Thus, the agent computing devices 94, 98 may act as a thin client and may depend primarily on a remote server (e.g., the web server 22) for processing activities. In such an implementation, the agent computing devices 94, 98 may mainly focus on conveying input and output between the agent computing devices 94, 98 and the web server 22.

In FIG. 1, each agent 92, 96 has an associated agent telephone 93, 97 and an associated agent computing device 94, 98. Each agent computing device 94, 98 may rely on the web server 22 for processing with respect to the CTI application 23. Each agent computing device 94, 98 may be connected to the web server 22 via a network such as a local area network (LAN), a wide area network (WAN), or the Internet, for example. Although only two agents 92, 96 are shown in FIG. 1, it is contemplated that any number of agents and associated agent computing devices may be in communication with or otherwise affiliated with the institution system 5 and may be available to communicate with the user 85.

The web server 22 runs a computer program that is responsible for accepting hypertext transfer protocol (HTTP) requests from the agent computing devices 94, 98 and serving them HTTP responses along with optional data contents. Multiple web servers may be provided as each web server can handle a relatively small number of agents (e.g., 100-200 agents in an implementation). As additional agents come online, more web servers may be used. The web servers do the CTI processing for the agent computing devices. As noted, an enterprise may have hundreds or thousands of agents each with their own agent computing device. A large farm of web servers may be used to manage and track these thousands of agent computing devices.

The CTI application 23 may interact with a CTI server 26. The CTI server 26 may monitor the state of each agent telephone 93, 97. The CTI server 26 may send messages to each agent 92, 96 via the agent computing device 94, 98 and the CTI application 23. The CTI server 26 and each agent computing device 94, 98 may be connected via a network such as a LAN, a WAN, or the Internet, for example.

A private branch exchange (PBX) 28 may be provided between each agent telephone 93, 97 and the CTI server 26. The PBX 28 is a telephone exchange that serves a particular business or office, as opposed to one that a common carrier or telephone company operates for many businesses or for the general public. PBXs make connections among the internal telephones of a private organization, usually a business, and also connect them to the public switched telephone network (PSTN) via trunk lines. Functionally, the PBX 28 performs duties such as establishing connections between the telephone sets of two users (e.g., mapping a dialed number to a physical phone, ensuring the phone is not already busy), maintaining such connections as long as the users require them (i.e., channeling voice signals between the users), disconnecting those connections as per the users requirement, and providing information for accounting purposes (e.g., metering calls).

The user 85 may have an associated user computing device 90 such as a personal computer (PC), a handheld computing device, a personal digital assistant (PDA), or a mobile phone, for example. An example user computing device is described with respect to FIG. 6. The user 85 may be affiliated with the institution (e.g., a member of the institution) or may be external to the institution (e.g., unaffiliated with the institution).

The user computing device 90 and the institution system 5 may be connected over a network. It is contemplated that the network may be any type of private or public communication network such as, for example, an intranet, the Internet, a LAN, a WAN, a wireless fidelity (WiFi) network, a PSTN, a cellular network, a voice over Internet protocol (VoIP) network, and the like. The user 85 may also communicate with the institution system 5 by phone, email, web chat, instant message, text message, facsimile, mail, and the like. The network also may connect agents 92 and 96 to the institution system 5 via their associated agent computing devices 94 and 98, respectively. An example agent computing device is described with respect to FIG. 6.

An application may run on the user computing device 90 that establishes a connection with the institution system 5, such as with a user interface module 20, an integration and aggregation engine 21, and/or a CTI server 26, as described further herein. The CTI infrastructure allows the phone state of each agent 92, 96 to be determined and reported to the user 85. The availability of the agents 92, 96 may be tracked (e.g., using information from the CTI server 26), and a wait time (referred to herein as an estimated wait time although the wait time may be determined to be an actual wait time or a precise wait time depending on the implementation) may be calculated and provided to the user 85. The CTI server 26 allows the status of an agent (e.g., busy with a phone call) to be known and reported, and can be used to provide the user computing device 90 with information on whether an agent is currently (e.g., immediately) available to take a phone call from the user 85 (e.g., agent(s) availability and/or estimated wait time(s) information 40).

An application on the user computing device 90 may provide an indication on the user computing device 90 (e.g., via a status indicator or icon provided on the desktop or display of the user computing device 90) as to how many agents are currently available to speak with the user 85 (if the user were to immediately phone in to the institution) and/or an estimated wait time until an agent becomes available. As described further herein, the indication may be persistent and displayed on the desktop or display of the user computing device 90 in any page or application that the user 85 may be accessing or using.

Availability of agents with various expertises or affiliated with different subject areas or divisions of the institution (e.g., banking, investing, life insurance, annuities, savings accounts, credit cards, financial and retirement planning, etc.) may be displayed. Each agent may be associated with one or more subject areas or divisions. Availability of particular agents (e.g., by name, by region, by language spoken, etc.) may be displayed.

The user 85 may call in when an agent is available (e.g., when there is no wait for an agent to become available to communicate with the user 85). The user 85 may call the agent via any type of phone, such as a wired or wireless phone, a mobile phone, a cellular phone, a smartphone, a VOIP phone, a softphone, and the like. In an implementation, the user computing device 90 may display a call icon (described further with respect to FIG. 2) that a user may select to place a call to an available agent via the user computing device 90. Such a call may be implemented using a VOIP application and/or phone or any softphone. In computing, a softphone is a software program for making telephone calls over the Internet using a general purpose computer, rather than using dedicated hardware. Often a softphone is designed to behave like a traditional telephone, sometimes appearing as an image of a phone, with a display panel and buttons with which the user 85 can interact. A softphone may be used with a headset connected to the sound card of the user computing device 90, or with a USB (universal serial bus) phone.

In an implementation, a VoIP application on the user computing device 90 may be in communication with the institution system 5 and receive agent phone state and availability status via information from the CTI server 26. The user 85 may monitor the state of a particular agent to know when they are available for communication with the user 85. In an implementation, the VOIP application may automatically call the agent when the agent moves to a ready state (e.g., an available state). The VOIP application may provide for a pooling of multiple agents that the user 85 may be interested in communicating with. The user 85 could place identifiers of the agents into a pool and prioritize a call order (e.g., for automatic calling, for notification, etc.) when the agents become available.

In an implementation, as described further herein, the user computing device 90 may display a call icon that a user may select to receive a callback from an available agent. Based on contact information pertaining to the user 85 that the institution system 5 may retrieve from storage 5 or receive from the user 85 (e.g., pursuant to a request for a phone number of the user 85), the institution system 5 may establish a phone call between an available agent and the user 85. In an implementation, the institution system 5 may automatically place a phone call from an available agent to the user 85 as soon as the agent becomes available. Alternatively, the user computing device 90 may automatically call an available agent upon the user computing device 90 receiving an indication from the institution system 5 that the agent has become available. In this manner, the user 5 does not have to monitor a status indicator or take note of when an agent becomes available. Thus, access to an available agent 45 is provided to the user 85, and the user 85 does not need to spend time on the phone waiting for an agent to answer their call. The user 85 knows when one of the agents 92, 96 is available (e.g., who has expertise in the subject matter of interest to the user 85).

In an implementation, the institution system 5, e.g., via information from the CTI server 26, may provide call volume statistics 50 pertaining to one or more agents to the user 85 via the user computing device 90, for example. The call volume statistics 50 may comprise information that may be used to determine when an agent or a group of agents (e.g., that share particular characteristics) is most likely unavailable and/or most likely available. Such information may comprise an average number of calls an agent handles in a particular time period, an average amount of time an agent spends on the phone in a particular time period, an average length of time between calls handled by an agent in a particular time period, etc. The information may be provided to the user 85 in any format. The user 85 may use this information to determine when to likely expect to be able to receive access to an available agent 45 (e.g., to communicate with an available agent).

In an implementation, the user 85 may set a phone, such as a phone associated with the user computing device 90, to automatically call an agent at a predetermined time or times, based on when an agent is likely to be available. Alternatively or additionally, the user 85 may instruct the institution system to attempt to establish a phone call between the user 85 and an agent at one or more predetermined times, based on when an agent is likely to be available. It is contemplated that the institution system 5 may also use the information to determine whether and where to add/remove agents for servicing users' calls (e.g., which subject area, which locations, etc.).

The institution system 5 may include a user interface module 20, an integration and aggregation engine 21, and a data source access engine 24. The user interface module 20 may generate and format one or more pages of content 19 as a unified graphical presentation that may be provided to the user computing device 90 as an output from the integration and aggregation engine 21 or the CTI server 26, for example. The page(s) of content 19 may be provided to the user computing device 90 via a website 18 associated with the institution system 5 or via a network connection or other communications connection.

In an implementation, the user 85 may use the user interface module 20, for example, to provide one or more characteristics of one or more agents that they would like to learn the availability of and/or to receive an estimated wait time until the agent(s) become available, and to provide identification and authentication information to the institution system, for example, via the user computing device 90. The user 85 may also use the user interface module 20 to provide contact information and instructions on receiving a phone call from an agent, e.g., when an agent becomes available or at a predetermined time based on call volume statistics 50 that may be generated and provided to the user 85.

In an implementation, instead of hosting the website 18, the institution system 5 may comprise a conventional application server hosting a proprietary online service accessible only a private network. In any event, the institution system 5 may have appropriate security mechanisms in place to prevent unauthorized third parties from intercepting the user's information.

The integration and aggregation engine 21 may receive agent availability and estimated wait time data pertaining to the agents 92, 96 from the CTI server 26, and generate agent availability and estimated wait time information 40 based thereon to be provided to the user computing device 90. The agent availability and estimated wait time information 40 may be based on the availability and estimated wait time data for one or more agents, such as those agents that meet the selected characteristics provided by the user 85. The integration and aggregation engine 21 may also generate call volume statistics 50 based on information received from the CTI server 26. The call volume statistics may be provided to the user 85 via the user computing device 90, for example.

The integration and aggregation engine 21 may retrieve data from data source(s) 25, storage 8, and other storage internal and/or external to the institution system, in an implementation, via the data source access engine 24. The integration and aggregation engine 21 may also receive data provided by the user 85 via the user computing device 90 and may receive data provided by an agent 92, 96 via an agent computing device 94, 98. The data may be received via the user interface module 20 in an implementation. The retrieved and/or received data may be associated with the user 85 and one or more agents 92, 96 and may be used to generate agent availability and estimated wait time information 40 that may be provided to the user computing device 90.

The data that the integration and aggregation engine 21 may retrieve or receive may be data pertaining to the location of the user 85, the location of agents 92, 96, and/or data pertaining to each agent 92, 96. Each agent's skill data may be stored in storage 8 or data source(s) 25, for example, such as in a skill database. In an implementation, the integration and aggregation engine 21 may determine which agent or agents fit a user's selection of characteristics based on skill data that may be retrieved from the skill database.

The integration and aggregation engine 21 may use tools, calculators, applications, and aggregators, for example to analyze agent availability data and estimated wait time data received from the CTI server 26 and generate availability and estimated wait time information based thereon, as well as call volume statistics 50, to be provided to the user computing device 90. In an implementation, the integration and aggregation engine 21 aggregates multiple agents' availability to show total availability of at least one of the agents, e.g. for one or more subject areas requested by the user 85, for one or more agents who meet characteristics provided by the user 85, for one or more agents in a region associated with the location of the user 85, for all agents who may service the user 85, etc. The integration and aggregation engine 21 may use input from the user 85, received via the user interface module 20 for example, and information known about the user 85, received by the data source access engine 24 for example, to determine which agents' availability, wait times, and call volume statistics to aggregate and provide to the user 85.

In an implementation, data for the user 85 regarding agent availability, estimated wait time, and/or call volume statistics may be integrated into a single unified presentation, which may then be sent to the user interface module 20 for presentation to the user 85. Through this mechanism, the user 85 may quickly see if an agent is available for the user 85 to communicate with, an estimated wait time until an agent becomes available, and/or when an agent may likely be available based on the call volume statistics 50.

The user 85 may interface with the institution system 5 via the website 18 that may display one or more pages of content 19 to the user 85 on the user computing device 90. A request from the user 85 may be received at the institution system 5 through any suitable means, such as interaction with a web browser that is in communication with the integration and aggregation engine 21 or other computing device within the institution system 5. The actual mechanism of connection is outside the scope of the present discussion. In an implementation, the request may be processed by the integration and aggregation engine 21, which then provides the user 85 with a response to the request, e.g., in the form of one or more status indicators, described further herein. The user 85 may also place a call and/or request a callback via one or more call icons, described further herein.

In an implementation, only a member or registered user of the institution system 5 may receive agent availability and estimated wait time information 40, access to an available agent 45, and call volume statistics 50. Alternatively, any user of the website 18 may receive agent availability and estimated wait time information 40, access to an available agent 45, and call volume statistics 50. In an implementation, access may be limited by various restrictions, such as a pilot group, products, age, etc., to allow only a target audience to receive agent availability information, estimated wait time information, access to an available agent, and/or call volume statistics.

The user computing device 90 may provide user access to a system which is coupled to the integration and aggregation engine 21 and is configured to receive a plurality of user requests, at least one of which is a request for agent availability information and estimated wait time information 40, access to an available agent 45, or call volume statistics 50. A system may be configured to format and transmit a graphical user interface to user 85, and through the graphical user interface provide the user 85 with the ability to receive agent availability and estimated wait time information 40, access to an available agent 45, and call volume statistics 50 provided by the institution system 5. A user access system may be communicatively coupled to the integration and aggregation engine 21 (or the CTI server 26 in an implementation) and may be configured to send machine-readable instructions to the integration and aggregation engine 21 (or the CTI server 26). Those instructions may cause the integration and aggregation engine 21 to access the CTI server 26, data source(s) 25, and storage 8.

As mentioned above, the integration and aggregation engine 21 may provide a unified graphical presentation output. The unified graphical presentation may be transmitted to the user access system. In an implementation, the unified graphical presentation is combined with other materials and transmitted to the user 85. In an implementation, the unified graphical presentation is received by the user access system and transmitted directly to the user 85 without the inclusion of any other materials.

The user access system may be implemented as a web server in an implementation. The user access system, through the use of any suitable interactive web technology, provides an interactive experience to the user 85 through which access to and maintenance of agent availability and estimated wait time information, access to an available agent, and call volume statistics can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 5 may comprise one or more computing devices 6. The user computing device 90 may allow a user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user 85 and the agents 92, 96 may be stored in storage 8 or other storage such as data source(s) 25, for example.

Examples of software modules 9 may include modules for identifying and authenticating a user, generating web page content, status indicators, and/or status indicator content for display, and receiving and servicing requests and instructions from a user, described further herein. While specific functionality is described herein as occurring with respect to specific modules, the functionality may likewise be performed by more, fewer, or other modules. An example computing device and its components are described in more detail with respect to FIG. 6.

In an implementation, the institution system 5 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may receive and process agent availability information and estimated wait time information.

Figure 2:
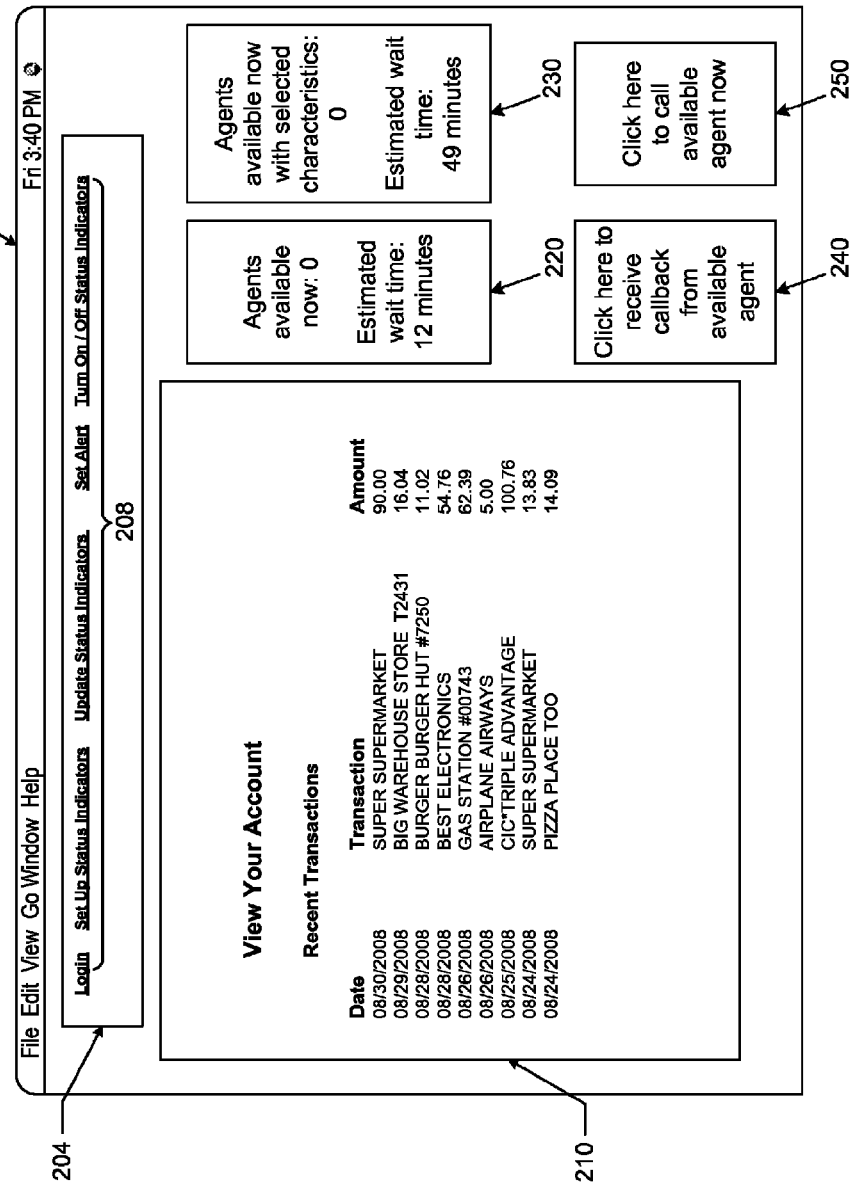
FIG. 2 is a diagram illustrating a display in which agent availability and access information may be rendered.

FIG. 2 is a diagram illustrating a display 200 in which agent availability and access information may be rendered. The display 200 of the user computing device 90 may provide any type of content 210, such as content from an application running on the user computing device 90, for example. In an implementation, the display 200 may be associated with a browser of the user computing device 90 and may provide content from a website such as the website 18 of the institution system 5, for example.

One or more status indicators 220, 230 may be provided that display agent availability and estimated wait time information. In an implementation, the status indicator 220 may provide agent availability and estimated wait time information for any agent to communicate with the user 85. Additionally or alternatively, in an implementation, the status indicator 230 may provide agent availability and estimated wait time information for one or more particular agents having certain characteristics (e.g., as selected by the user 85 and/or the institution system 5) to communicate with the user 85. The status indicators 220, 230 shown in FIG. 2 are merely provided as examples, and it is contemplated that additional and/or alternative status indicators may be provided, directed to various characteristics, agents, and agent profiles (described further herein), for example.

The status indicators 220, 230 may be persistent as the user 90 browses to various websites. The status indicators 220, 230 may be configured so that they are always visible on the display, even when there is an application open, i.e., a word processor or spreadsheet program, and the browser may be closed or not visible. In an implementation, multiple status indicators may be provided, with each status indicator directed to agent availability in a particular subject area or division of the institution, such as banking, investments, etc. The user 85 may thus be provided with agent availability information and/or estimated wait time information 40 for agents in each of multiple subject areas or divisions of the institution.

In an implementation, a status indicator may indicate that an agent is not currently available (e.g., "agents available now: 0"). The user may move a pointer (e.g., via a mouse or other input or pointing device) over the status indicator and be provided with an estimated wait time until an agent becomes available.

A notification may be provided on the display 200 when an agent is available to communicate with the user. A notification may be provided by any technique(s), such as by a phone call, an email, an instant message, a text message, a facsimile, etc. In an implementation, when the user 85 moves pointer a over a notification on the display 200 that an agent is available or a status indicator indicating that an agent is available or the estimated wait time is zero (or below a certain predetermined amount of time, for example), details about the available agent may be provided to the user, e.g., in a pop-up window on the display 200. Details may include the agent's name, title, phone number and/or contact information, area(s) of expertise, experience level, etc.

One or more call icons 240, 250 may be provided that may provide access to an available agent. In an implementation, the call icon 240 may allow the user 85 to indicate that they would like to receive a callback from an available agent. After the user 85 clicks or otherwise selects the call icon 240, for example, previously stored phone numbers associated with the user 85 may be retrieved and displayed in a window, and the user may select one of the numbers to be called back on or the user 85 may receive the callback on a default phone number retrieved from storage, in which case the user 85 may not make a callback phone number selection after selecting the call icon 240. Alternately, the user 85 may enter a number in a window on which to receive the callback. The user 85 may also input comments or questions into a window for example, that may be provided to the available agent ahead of the callback.

When the request for a callback is submitted, an available agent may call the user 85 back, in some embodiments immediately, using the number the user 85 selected or entered or retrieved from storage. If the user 85 selects the call icon 240, and an agent is unavailable, the user 85 may be notified that an immediate callback is not available, but a callback may be made at some point in the future (at a user selectable time, for example, or as soon as an agent is available). The user 85 may be provided with an estimated wait time. Alternatively, the callback request may be sent to a less appropriate (less skilled, for example) agent for quicker, and in some embodiments immediate, handling.

In an implementation, the call icon 250 may allow the user 85 to place a call to an available agent via the display 200. By the user 85 selecting the call icon 250, the user computing device 90 may call an available agent for the user 85, e.g., via a softphone application of the user computing device 90 or any phone calling application that may be associated with the user computing device 90. The user 85 may select the call icon 250 when a status indicator indicates that an agent is available or upon receiving a notification that an agent is available.

In an implementation, rather than being associated with phone calls, the call icons may be associated with web chat sessions between the user 85 and an available agent. Thus, selection of the call icon 240 may initiate a web chat callback from an available agent to the user 85, and selection of the call icon 250 may initiate a web chat by the user 85 with an available agent.

The call icons 240, 250 are merely provided as examples, and it is contemplated that additional and/or alternative call icons may be provided, directed to various characteristics, agents, and agent profiles, for example. The status indicators 220, 230 and the call icons 240, 250 may be provided as windows, icons, selectable buttons or menus, or any other input or output elements that may be placed in any arrangement and displayed anywhere on a display of the user computing device 90. The information in the status indicators 220, 230 and the call icons 240, 250 may be provided by the institution system 5 as described further herein.

In an implementation, a toolbar 204 may be provided that may comprise one or more links 208 to one or more websites or web pages of the institution system 5. Each of the links 208 provided by the toolbar 204 may perform one or more predetermined functions when selected. One or more of the functions may be performed in conjunction with the institution system 5 (e.g., by accessing the institution system 5, such as a computing device or web site of the institution system 5) or may be performed locally to the user computing device 90 (e.g., by accessing an application on the user computing device 90).

In an implementation, at least one of the functions that a link may perform is to log the user 85 into a particular website or a particular web page of a website. Such a selection may result in the appropriate web page being provided to the user 85 with user data being retrieved and provided to the user 85 as personalized content in the web page. In an implementation, the user 85 may be asked to provide login information for the website. In another implementation, the user 85 may be automatically logged in to the website or web page pursuant to a user selection of one of the links 208.

In an implementation, the functions may pertain to performing various actions regarding the status indicator(s) 220, 230 that provide and display agent availability information and/or estimated wait time information, such as setting up one or more status indicators 220, 230, updating the status indicators 220, 230 (e.g., as to the agent information the status indicators should be directed to and/or display), setting an alert or notification (e.g., as to when an agent may be available, when an estimated wait time reaches a certain value, etc.), and turning on or off the status indicator(s) 220, 230 from the display of the user computing device 90. Additionally or alternatively, the functions may pertain to performing various actions regarding the call icon(s) 240, 250 to establish a phone call, web chat, or other communication between the user 85 and an available agent, such as setting rules as to when and how to attempt to establish a communication between the user 85 and an available agent, how frequently to make such an attempt, contact information for the user 85, etc.

The toolbar 204 may be any type of toolbar comprising buttons, icons, menus, or other input or output elements that may be placed in any arrangement and displayed anywhere on a display of the user computing device 90. In an implementation, the toolbar 204 may comprise a dropdown menu that may provide the links 208 to the user 85. The toolbar 204 may comprise an icon that provides access to the dropdown menu of links 208 when selected. The icon may be a plug-in icon with an associated dropdown arrow that provides access to the links 208 that the user 85 may select. The plug-in icon may be installed on an existing toolbar in an implementation. When selected (e.g., by clicking or by any other known selection technique), the dropdown menu may be provided in a conventional dropdown manner. In this manner, the links 208 may drop down and become visible as a list of selectable function links. The links 208 to be displayed in the dropdown menu may be selected by the user 85 and may be personalized by the user 85. The arrangement shown in FIG. 2 is exemplary only, and any suitable arrangement may be used.

Figure 3:
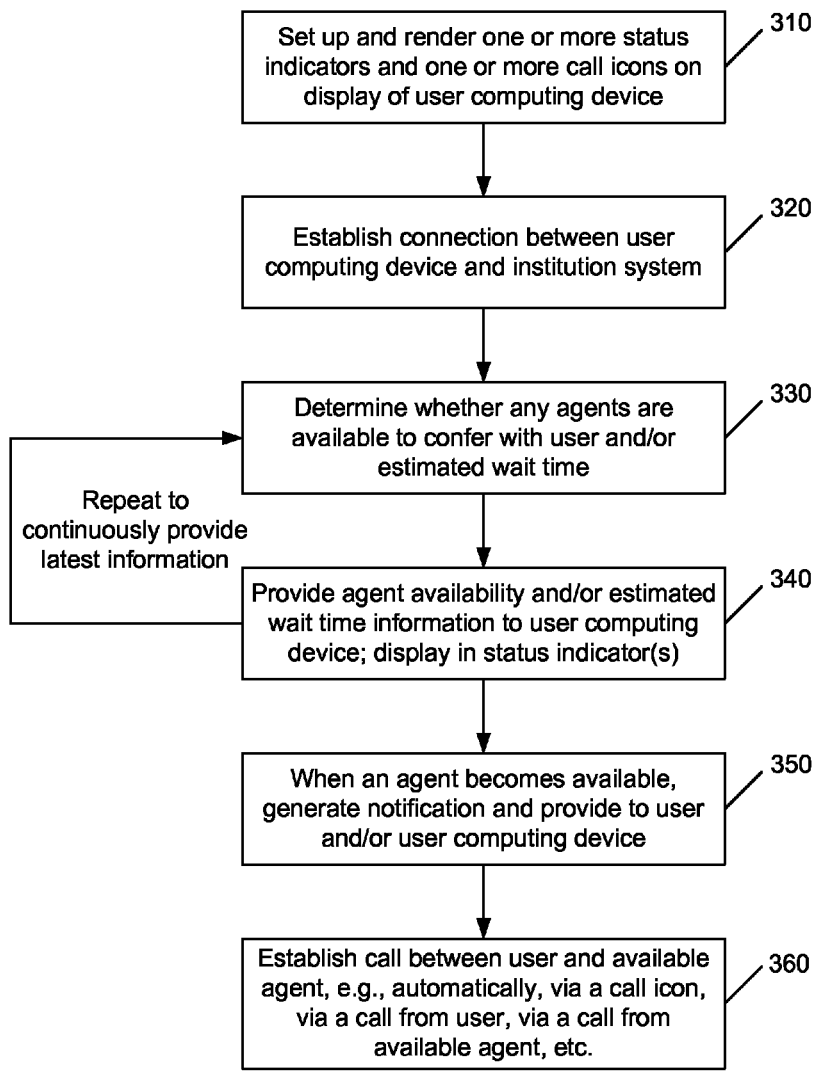
FIG. 3 is an operational flow of an implementation of a method that may be used to provide access to an available agent.

FIG. 3 is an operational flow of an implementation of a method 300 that may be used to provide access to an available agent. At 310, one or more status indicators and one or more call icons may be set up and rendered or otherwise installed on a display of a user computing device. The status indicator(s) may be set up and rendered without a connection to the institution system though the status indicator(s) will not yet contain current agent availability information. In an implementation, the status indicator(s) and/or the call icon(s) may be installed via a downloaded file or a computer program that may be downloaded or retrieved from storage associated with the user computing device. Functional options of the status indicator(s) and/or the call icon(s) may be selected during installation.

By visiting a website, a browser can load the instructions used to render the status indicator(s) and/or the call icon(s). In an implementation, the user may enter login information, and by so doing permit a version of the status indicator(s) and/or the call icon(s) to be loaded that is customized based on the user's preferences, selections, personal data, and/or financial data which may be retrieved from storage based on the login information.

In an implementation, the user may be provided with a link (e.g., in an email, on a website, etc.) that provides the user with access to a process to set up the status indicator(s) and/or the call icon(s). If the user is identified and authenticated, the status indicator setup and/or the call icon setup may be personalized to the user (e.g., using user preferences or data from storage comprising such preferences or data). If the user is not properly identified and authenticated, the identification and authentication process may repeat a predetermined number of times. If the user fails to authenticate, or if the user chooses not to provide identification information, default user preferences may be used in the status indicator setup and/or the call icon setup, in an implementation.

In an implementation, the properties of the user computing device on which the status indicator(s) and/or the call icon(s) are to be rendered may be determined. Such properties may include, but are not limited to, the user computing device's display resolution capabilities, communications connection speed, available storage space, computing speed or relative computing speed, browser type and version, and the like.

At 320, a connection may be established between the user computing device and the institution system. In this manner, in an implementation, the user computing device may receive information from the CTI of the institution system, either directly or indirectly (e.g., via an integration and aggregation engine or other computing device within the institution system).

At 330, it may be determined whether any agents are available to confer with the user. In an implementation, the number of agents that are currently available (e.g., "available now") may be determined. Additionally or alternatively, for example if no agent is currently available, an estimated wait time until an agent is available may be determined.

In an implementation, the availability of agents in particular subject areas or divisions of the institution may be determined, and for those subject areas or divisions in which an agent is not currently available, an estimated wait time until the next available agent in that subject area is available may be determined.

At 340, the agent availability and/or estimated wait time information may be provided to the user computing device. The information may be rendered or displayed on the user computing device in the status indicator(s). Processing may continue at 330 and repeat, such that the current or latest agent availability and/or estimated wait time information may be continuously provided to the user computing device.

In this manner, the agent availability information and/or the wait time information may be repeatedly and/or continuously updated.

In an implementation, at 350, when an agent becomes available, a notification may be generated and provided to the user and/or the user computing device. In an implementation, a message or other indicator may be displayed on the user computing device. Alternatively or additionally, a notification may be sent to the user by phone, email, instant message, text message, facsimile, and the like. The notification may be generated and provided pursuant to any agent becoming available or pursuant to an agent in a particular subject area or division of the institution becoming available, depending on the implementation. In an implementation, the notification may provide information about the agent that is available, such as a name, a phone number, one or more areas of expertise, a title (e.g., associate, primary agent, manager, supervisor, etc.), etc.

At 360, a call may be established between the user and the available agent. The call may be initiated by the user, by the available agent, or by the institution system, depending on the implementation. For example, upon receiving the notification that the agent has become available, the user may call the agent by dialing the appropriate phone number (e.g., the agent's phone number, the institution's phone number, etc.) using any type of phone. Alternatively, the user may select a call icon on the display of the user computing device either to initiate a call via a softphone or Internet protocol (IP) phone, for example, of the user computing device or to request a callback from the available agent.

In an implementation, pursuant to one or more rules previously established by the user or the institution system, for example, the user computing device or a user telephone may automatically call an available agent upon receiving notification that the agent has become available. Similarly, the agent computing device or the agent telephone may automatically call the user as soon as the agent becomes available (e.g., based on the agent state tracked by a CTI server). In such an implementation, the user may provide the institution system with contact information or other instructions that they would like to receive a call from the agent when the agent becomes available. Thus, access to an available agent may be provided to the user and hold times for the user may be eliminated. It is noted that the user and the available agent may communicate using techniques other than a phone call, such as via a web chat, instant message, text message, and the like.

Figure 4:
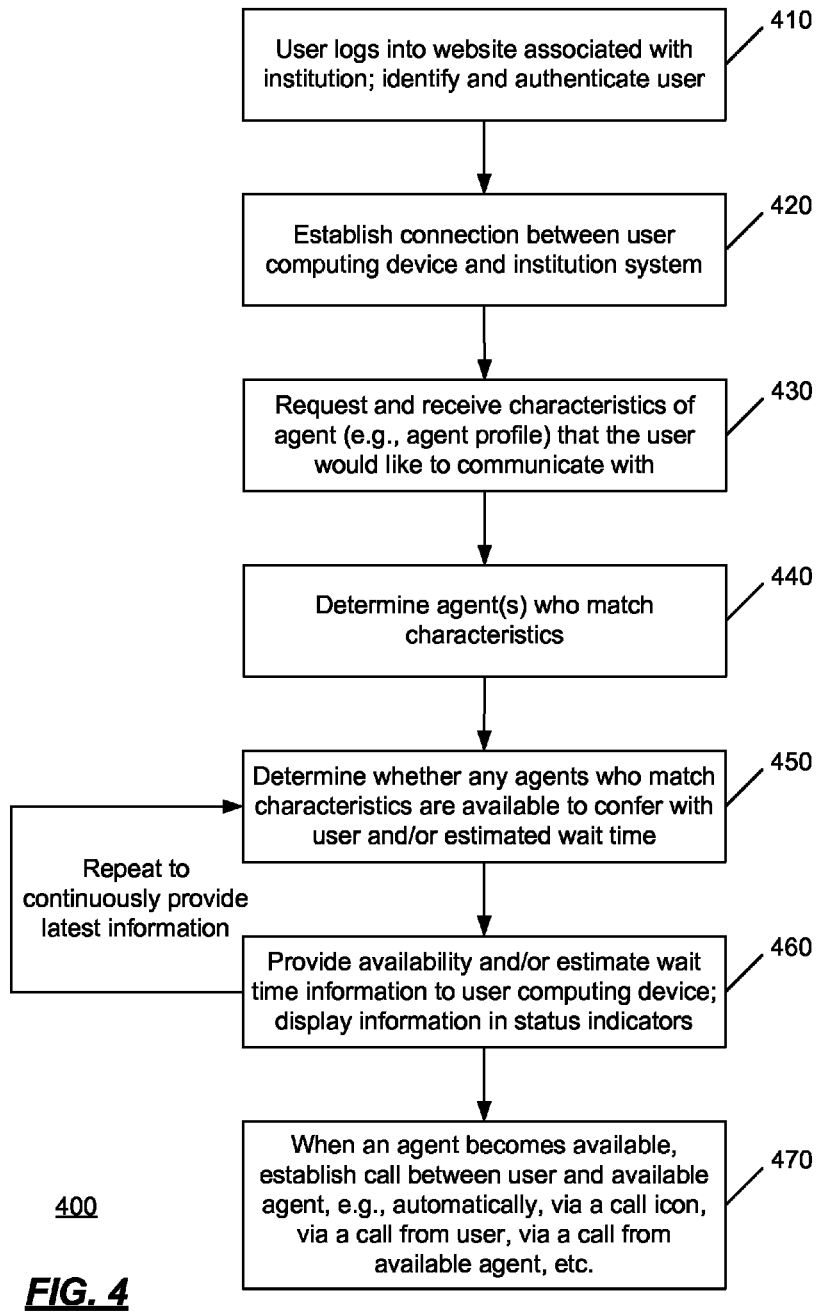
FIG. 4 is an operational flow of another implementation of a method that may be used to provide access to an available agent.

FIG. 4 is an operational flow of another implementation of a method 400 that may be used to provide access to an available agent. At 410, a user may log into a website associated with the institution, and may be identified and/or authenticated using known identification and/or authentication techniques. At 420, similar to 320 for example, a connection may be established between a user computing device and the institution system to allow the user computing device to receive information from the CTI of the institution system.

At 430, characteristics of an agent that the user would like to communicate with may be requested and received from the user. Characteristics may include one or more areas of expertise, a level of expertise, a title of the agent, a language spoken by the agent, etc., for example. The user may provide the characteristics of an agent with whom they would like to communicate. Such characteristics may be provided as an agent profile.

In an implementation, the user may request to communicate with a particular agent, e.g., by name or other identifier. For example, the user and the particular agent may have communicated in the past. In an implementation, the user may select to communicate with more than one agent (e.g., in a phone call with more than one agent participating in the phone call).

In an implementation, the user's call history of previous calls with the institution and agents of the institution and related call information may be retrieved from storage (e.g., associated with a CTI server) and provided to the user. The user may use this information to determine which agent(s) they have communicated with in the past, and may request that they be apprised of the availability of the agent(s). The user may request that they be notified when the agent(s) become available.

The website may provide an icon, a button, pulldown or dropdown menu, etc. for a user to select one or more characteristics of an agent (e.g., an agent profile) with whom they would like to communicate. The user may request to communicate in a subject area with a particular agent or a member of an agent group associated with the subject area. Thus, the user may choose a subject area and/or an agent to communicate with. Subject areas that the user may choose from may be shown to the user that are based on data that the institution has stored and retrieved or received pertaining to the user (e.g., marital status, loans, credit cards, number of dependents, products the user has, amount of assets, etc.).

At 440, one or more agents who meet the characteristics or agent profile received from the user may be determined. Such a determination may be made by comparing characteristics information from the received agent profile to a database of agent characteristics, for example.

At 450, it may be determined whether any agents who meet the agent profile are available to confer with the user. In an implementation, the number of agents that are currently available (e.g., "available now") may be determined. Additionally or alternatively, for example if no agents are currently available, an estimated wait time until an agent becomes available may be determined.

In an implementation, the user may provide more than one agent profile and provide a priority ordering of the agent profiles. In this manner, a user may select characteristics of a first type of agent (e.g., via a first agent profile) to communicate with ahead of a second type of agent to communicate with (e.g., via a second agent profile), if an agent matching the first agent profile is available. Otherwise, the user may communicate with an agent matching the second agent profile if such an agent is available before an agent matching the first agent profile becomes available.

At 460, the agent availability and/or estimated wait time information may be provided to the user computing device. The information may be rendered or displayed on the user computing device in one or more status indicators. Processing may continue at 450 and repeat, such that the current or latest agent availability and/or estimated wait time information may be continuously provided to the user computing device.

Similar to 360, at 470, when an agent becomes available, a call or other type of communication (e.g., web chat, text message, instant message, etc.) may be established between the user and the available agent. Depending on the implementation, the call or other type of communication may be established pursuant to any agent becoming available or a particular agent becoming available (e.g., an agent in a particular subject area, an agent with a particular expertise, an agent matching the characteristics or agent profile provided by the user, etc.).

In an implementation, if the user selected to speak with more than one agent in the same phone call, a call may be established with the user when multiple agents (meeting any other characteristics provided by the user) are available.

Figure 5:
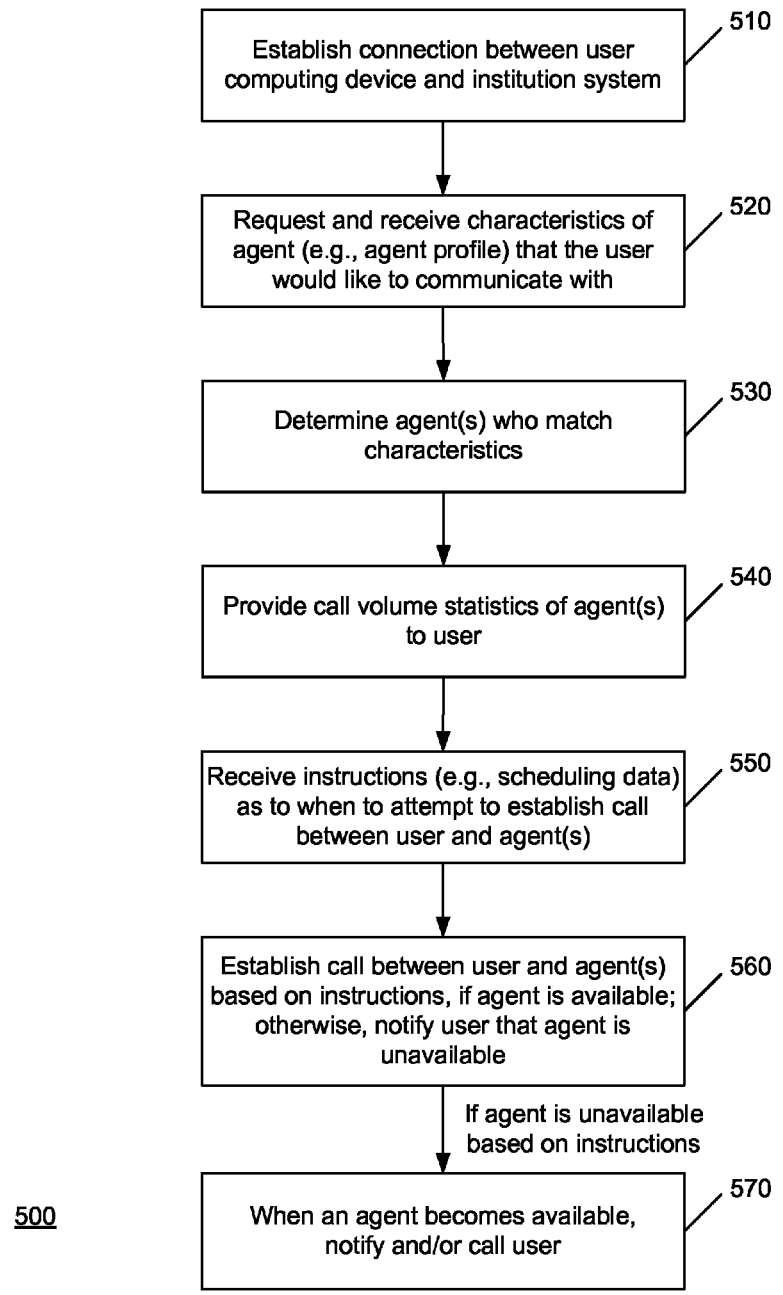
FIG. 5 is an operational flow of another implementation of a method that may be used to provide access to an available agent.

FIG. 5 is an operational flow of another implementation of a method 500 that may be used to provide access to an available agent. At 510 through 530, similar to 420 through 440, a connection may be established between a user computing device and the institution system, characteristics of an agent that the user would like to communicate with may be requested and received from the user, and one or more agents who meet the characteristics or agent profile received from the user may be determined.

At 540, call volume statistics of the one or more agents may be determined (e.g., based on data from the CTI server) and provided to the user via the user computing device, for example. The call volume statistics for a particular agent and for a particular subject area or division may be presented. The call volume statistics may provide time slots (e.g., in the form of a calendar or any other data format) for a given date range and subject area and/or agent or agent group and may provide historical information as to when the agent or agent group was unavailable or available. The call volume statistics may also provide information, such as a probability or a likelihood, as to when in the future the agent or agents may be available to communicate with the user. The user may use this information to determine or predict one or more times when an agent may be available for communication with the user, e.g., particular days, particular times of the day, etc.

At 550, the user may provide instructions as to when to attempt to establish a call between the user and the agent(s). In an implementation, the instructions may contain scheduling data such as a day, a time of day, and contact information for the user and/or the agent(s). The instructions may comprise rules regarding a number and a frequency of attempts to establish a call if the first attempt is unsuccessful. Depending on which party is to initiate the call, the instructions may be provided to the user computing device or a phone or application associated with the user, or the institution system or a computing device or phone associated with the agent(s). Thus, the user may schedule a call online with an individual agent (e.g., certified financial planner, select relationship manager, etc.) or an agent group (e.g., retirement advisors, annuities, investment planning, retirement planning, 401k rollover, long term care, etc.), based on estimated or predicted availability of the agent or group.

In an implementation, the user may select a time slot corresponding to a time and date on a calendar. The selection may be made by clicking on or highlighting the time slot, in an implementation. The user may provide contact information (e.g., the phone number to be called at) and may note that one or more additional persons (e.g., their spouse, their children, the user's financial planner, other agents, etc.) are to be included on call and may provide the additional person(s) names and contact information. The user may also provide comments that they would like the agent to consider, e.g., ahead of the scheduled call. The user may also provide information pertaining to any reminders they would like to receive about the scheduled call.

In an implementation, the user may provide instructions that a call is to be made via their phone or user computing device to a particular agent at a particular time or in a particular range of time (such as 2 pm to 4 pm, before 12 pm, any time on Mondays, etc.) only if the agent is available at that particular time or in the particular range of time.

At 560, a call may be established between the user and the agent(s) pursuant to the instructions of 550. The call may be attempted at the particular day and/or time set by the user (e.g., based on the call volume statistics) and may be initiated at the user side or the institution system or agent side depending on the implementation. The call may be established if the agent(s) to be on the call is available. If the call cannot be established because an agent is unavailable, the user may be notified, and additional attempts may be performed in accordance with the instructions provided by the user.

If the call cannot be established because the agent is unavailable throughout the attempts based on the instructions, the institution system may provide a notification to the agent to call the user when the agent becomes available. Alternatively or additionally, the institution system may provide an estimated wait time to the user, notify the user when the agent becomes available, and/or call the user when the agent become available, e.g., pursuant to information received from the CTI server.

Figure 6:
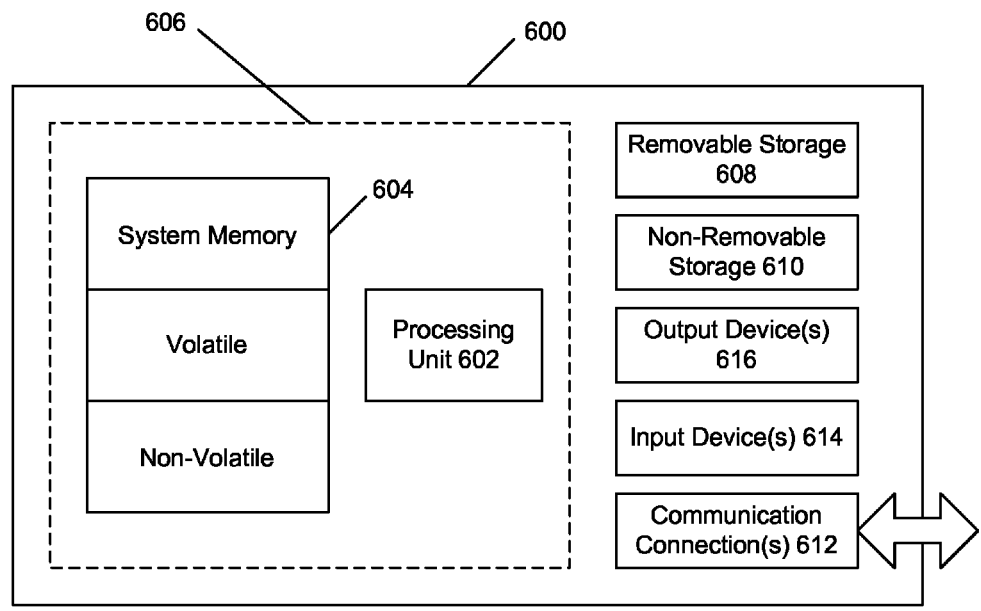
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and the invention includes equivalents thereof.

What is claimed is:

1. A method of providing communication access to an institution communication system agent, comprising:
   determining information pertaining to whether at least one of a plurality of institution communication system agents is available to communicate with a user device via an institution communication system;
   providing a number of selectable agent characteristics to the user device;
   receiving a selection of at least two of a plurality of the selectable agent characteristics from the user device;
   receiving a priority ordering of the selectable agent characteristics from the user device; and
   establishing a communication between the user device and the at least one of a plurality of institution communication system agents based on the information and the priority ordering.

2. The method of claim 1, wherein determining the information pertaining to whether the at least one of a plurality of institution communication system agents is available to communicate with the user device comprises determining an availability of each of the plurality of institution communication system agents to communicate with the user device, and wherein the information comprises a wait time until at least one of the plurality of institution communication system agents is available to communicate with the user device.

3. The method of claim 1, wherein the communication comprises at least one of a web chat or a telephone call placed by the user device.

4. The method of claim 1, wherein the communication comprises a telephone call requested by the user device and placed by the at least one institution communication system agent.

5. The method of claim 1, further comprising providing a notification when the at least one institution communication system agent is available, the communication further being established responsive to the notification.

6. A method of providing access to an institution communication system agent, comprising:
- receiving at least one agent characteristic from a user device;
- determining at least one of a plurality of institution communication system agents having the at least one characteristic;
- providing the user device with a status indicator pertaining to an availability of the at least one institution communication system agent to communicate with the user device and a wait time until the at least one institution communication system agent is available;
- providing a number of selectable agent characteristics to the user device;
- receiving a priority ordering of the plurality of institution communication system agents from the user, wherein the priority ordering is based at least in part on a user selection of at least one of the selectable agent characteristics; and
- establishing a communication between the user device and the at least one institution communication system agent responsive to the status indicator and the priority ordering.

7. The method of claim 6, wherein the communication comprises at least one of a web chat or a telephone call placed by the user device.

8. The method of claim 6, wherein the communication comprises a telephone call requested by the user device and placed by the at least one institution communication system agent.

9. The method of claim 6, further comprising providing a notification to the user device when the at least one institution communication system agent is available, the communication further being established responsive to the notification.

10. The method of claim 6, wherein one of the plurality of institution communication system agents is without the at least one characteristic, and wherein the status indicator comprises information pertaining to whether any of the plurality of institution communication system agents is available to communicate with the user device.

11. A non-transitory computer-readable medium comprising computer-readable instructions for providing access to an institution communication system agent, said computer-readable instructions comprising instructions that:
- provide a plurality of call volume statistics pertaining to at least one of a plurality of institution communication system agents to a user device;
- provide a plurality of selectable agent characteristics to a user device;
- receive a priority ordering of the plurality of institution communication system agents from the user device, wherein the priority ordering is based at least in part on a user selection of at least one of the plurality of selectable agent characteristics; and
- establish a call between the user device and the at least one of the plurality of institution communication system agents based on the call volume statistics and the priority ordering.

12. The computer-readable medium of claim 11, further comprising instructions that receive an instruction from the user device pertaining to the call in response to the call volume statistics, the call being further established in accordance with the instruction.

13. The computer-readable medium of claim 11, wherein the instruction comprises data directed to when to establish the call.

14. The computer-readable medium of claim 11, wherein the call volume statistics consists of at least one of an average number of calls the institution communication system agent handles in a time period, an average amount of time the institution communication system agent spends on the phone in the time period, or an average length of time between calls handled by the institution communication system agent in the time period.

15. The computer-readable medium of claim 11, further comprising instructions that identify the plurality of institution communication system agents based on at least one characteristic of the plurality of institution communication system agents.

16. The computer-readable medium of claim 15, further comprising instructions that receive the at least one characteristic from the user device prior to providing the call volume statistics.

* * * * *